United States Patent

[11] 3,577,129

[72] Inventor Klaus Jorg Hecker
Main-Taunus Kreis, Germany

[21] Appl. No. 760,616
[22] Filed Sept. 18, 1968
[45] Patented May 4, 1971

[73] Assignee Eichner Organisation GmbH
Frankfurt am Main, Germany

[54] INFORMATION READOUT CONTROL SYSTEM
6 Claims, 2 Drawing Figs.

[52] U.S. Cl. ........ 340/172.5
[51] Int. Cl. ........ G11b 1900, G11c 19/00
[50] Field of Search ........ 340/172.5; 235/157; 328/37

[56] References Cited

UNITED STATES PATENTS

| | | | |
|---|---|---|---|
| 3,037,194 | 5/1962 | Dirks | 340/172.5 |
| 3,051,787 | 8/1962 | Parks | 340/172.5X |
| 3,281,527 | 10/1966 | Davis et al. | 340/172.5X |
| 3,293,613 | 12/1966 | Gabor | 340/172.5 |
| 3,302,180 | 1/1967 | Donohoe | 340/172.5 |
| 3,328,766 | 6/1967 | Burns et al. | 340/172.5 |
| 3,454,930 | 7/1969 | Schoeneman | 340/172.5 |

*Primary Examiner*—Paul J. Henon
*Assistant Examiner*—R. F. Chapuran
*Attorney*—Michael S. Striker

ABSTRACT: A tape transport requires a predetermined time period for stopping after receipt of a stop signal. During this predetermined time period the information items from the tape are stored in a shift register. A second shift register with the same number of stages as the first shift register generates a signal from each stage corresponding to a stage in the first shift register wherein an information item was stored. When the tape transport is restarted the information from the first shift register is read out under control of timing signals and signals from the second shift register.

INVENTOR
KLAUS JÖRG HECKER
BY Michael J. Striker
ATTORNEY

INVENTOR
KLAUS JÖRG HECKEL
BY Michael S. Striker
ATTORNEY

INFORMATION READOUT CONTROL SYSTEM

BACKGROUND OF THE INVENTION

This invention relates to an arrangement for controlling the readout from a movable information carrier. In particular, it relates to the control of said readout during the time period required for a mechanical transport to come to a complete halt after receipt of a stop signal.

When a movable information carrier, as for example a tape, is used as an input to a data processing arrangement, it is of course essential that data items contained on the tape and readout during the time the mechanical transport comes to a halt not be lost. At the same time, this information should only be made available to the data processing arrangement after the subsequent start signal has been generated, since the stop signal signified that further information items were not required by the data processing arrangement.

SUMMARY OF THE INVENTION this invention is a system for controlling information readout. The system comprises movable information carrier means having information items stored thereon. Transport means serve to transport said information carrier means and are adapted to start upon receipt of a start signal, but require a predetermined time period for stopping after receipt of a stop signal. The system further comprises central control means for generating said start signal and said stop signal. Readout means serve to readout said information items from said information carrier means while said information carrier means is in motion. First storage means receive information items from said readout means after receipt of a stop signal and store said information items in predetermined storage locations. Designating means generate a plurality of designating signals, each of said designating signals signifying the presence of an information item in a given storage location. Finally, control means are comprised for reading out information items from storage locations designated by said designating signals upon receipt of a start signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
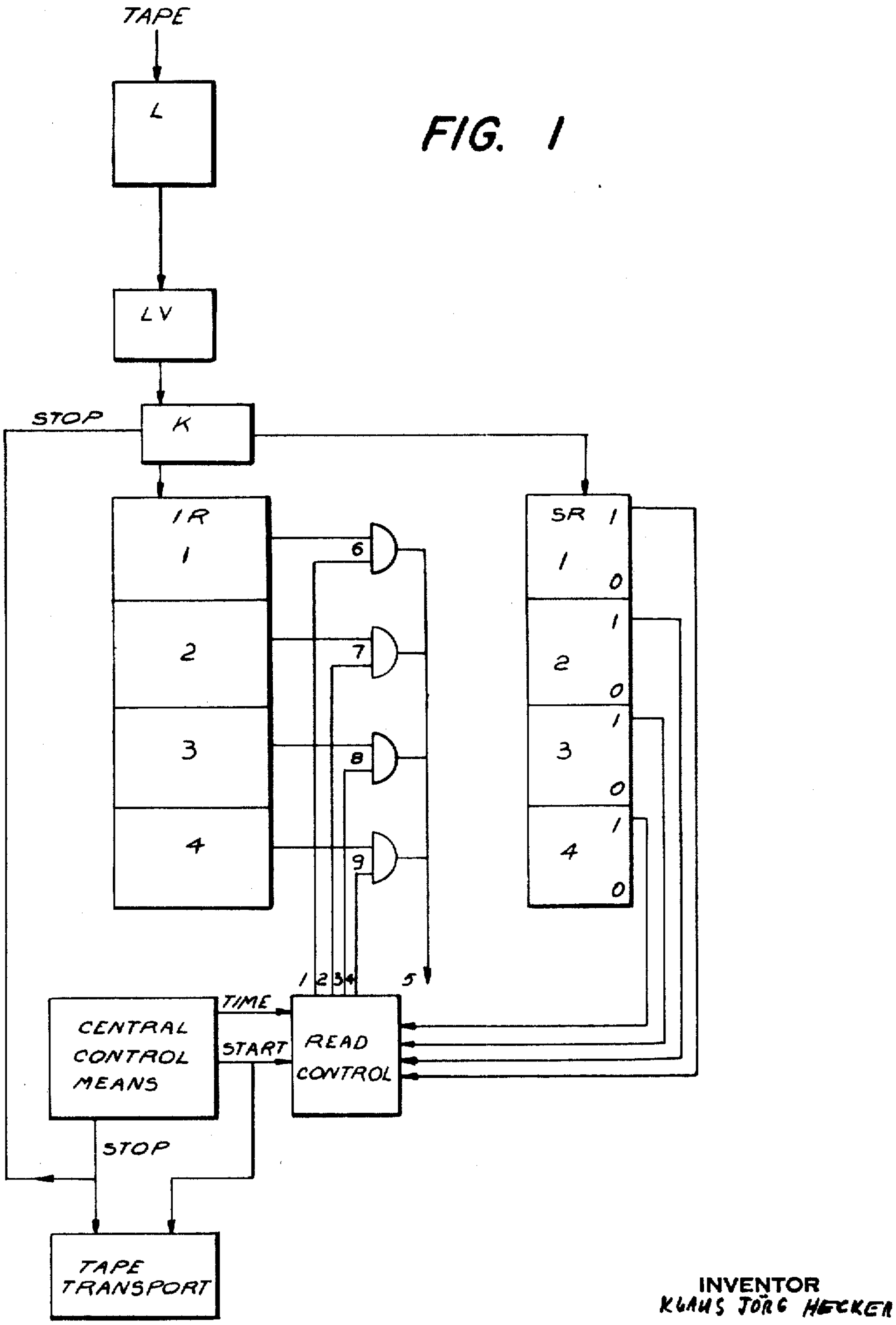
FIG. 1 is a block diagram of a system in accordance with the present invention.

As shown in FIG. 1, information items from movable information carrier means, as for example a tape, are read out by the readout means labeled L in FIG. 1. Each of the information items may, for example, comprise a number of binary digits. These readout means furnish information item signals which may, if necessary, be amplified in amplifier means designated LV. The output of this amplifier means passes through a gate labeled K after receipt of a stop signal and the information item signals are then furnished to storage means, in this case a shift register IR. For illustrative purposes, the shift register is shown to have four shift register stages labeled 1, 2, 3 and 4, respectively. In parallel with the shift register are connected designating means, in this embodiment additional shift register means labeled SR. This additional shift register also has four stages labeled 1, 2, 3 and 4, respectively. The outputs of these four stages of the shift registers are connected respectively to control means, in this embodiment four AND gates labeled 6, 7, 8 and 9, respectively. The second input for each of the AND gates is furnished on the lines labeled 1, 2, 3 and 4, respectively. The signal on these lines is dependent upon the simultaneous presence of a start signal furnished by central control means so labeled in FIG. 1 and a signal furnished from the corresponding stage of the shift register SR. As shown in FIG. 1, the central control means also furnishes the signal for mechanically stopping the tape transport.

Operation of the system is as follows: Each stage of the shift register SR is set to the "ZERO" position during the normal operation of the tape, Upon receipt of a stop signal, the tape begins to slow down but does not stop immediately. Further information items continue to be received by the readout means L and information item signals continue to be generated. Information item signals signifying the first information item are thus stored in Stage 1 of register IR after receipt of the stop signal. Simultaneously, the corresponding Stage 1′ of shift register SR is set to L. Upon receipt of the information item signal signifying the next information item, the signals previously contained in Stage 1 of register IR are shifted to Stage 2 of said register and the new information item signals signifying the following information item are entered into Stage 1. Simultaneously with the shift of information from Stage 1 to Stage 2, the second Stage 2′ of shift register SR is also changed to the L state. This process continues until the tape transport has been brought to a complete stop, thus causing no further information items to be supplied to the readout means.

Figure 2:
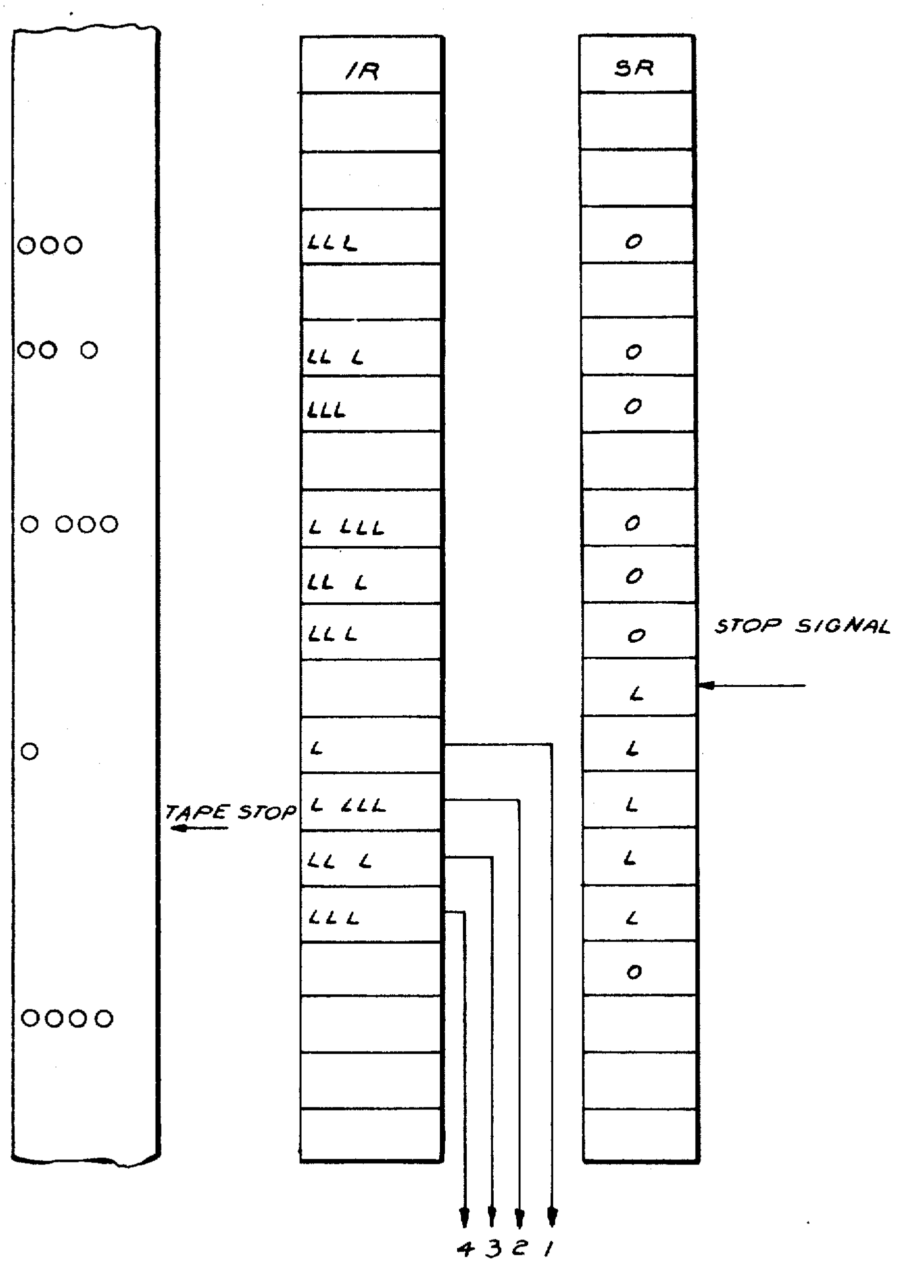
FIG. 2 is an illustration of the contents of the shift registers during a stop operation.

FIG. 2 illustrates the contents of shift register IR and the contents of shift register SR upon receipt of four information items from the tape (also illustrated).

When the next start signal is generated by the central control means, those AND gates of AND gates 6, 7, 8 and 9 corresponding to stages of shift register IR containing information items are energized in turn and their output supplied to the data processing arrangement via common line 5. The timing signals for this readout are supplied by the central control means while the storage locations, or shift register stages, to be interrogated are selected by the designating signals furnished by shift register SR. Upon completion of the tape readout, which takes place after the receipt of the start signal but before the tape transport has reached its normal operating speed, the normal conditions for supplying information to the data processing arrangement from the tape are restored by the central control means.

It should be noted that while in the present embodiment information is shown to enter the shift register IR only after the generation of the stop signal, alternate control arrangements are possible wherein the information normally passes through the shift register IR and shift register SR is used to control the readout from the shift register IR only after receipt of a stop signal while under other operating conditions the readout from this register is controlled by other means.

While the invention has been illustrated and described as embodied in a system wherein a particular arrangement is used for storing and reading out the information items during the tape stop operation, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

I claim:

1. System for controlling information readout, comprising, in combination, movable information carrier means having information items stored thereon; transport means for transporting said information carrier means, said transport means being adapted to start upon receipt of a start signal and requiring a predetermined time period for stopping after receipt of a stop signal; central control means for generating said start signal and said stop signal; readout means for reading out said information items while said information carrier means is in motion thus generating information item signals; first storage means for receiving said information item signals from said readout means after receipt of a stop signal and storing said information items signals in predetermined storage locations; designating means for generating a plurality of designating signals, each of said designating signals signifying the presence of information item signals in a given storage location; and control means for reading out information item signals from storage locations designated by said designating signals upon receipt of a start signal.

2. An information readout control system as set forth in claim 1, wherein said storage means comprise shift register means having a plurality of shift register stages; and wherein each information item signal received by said storage means is transferred to a subsequent one of said shift register stages upon receipt of the following information item signal.

3. An information readout control system as set forth in claim 2, wherein said designating means comprise additional shift register means having a plurality of additional shift register stages corresponding in number to said plurality of shift register stages, each of said additional shift register stages generating a designating signal when an information item signal is stored in the corresponding shift register stage.

4. An information readout control system as set forth in claim 3, wherein said central control means also furnishes timing signals; and wherein said control means comprise a plurality of control means, one for each of said shift register stages, for controlling the readout from the said stage under control of the corresponding designating signal and one of said timing signals.

5. An information readout control system as set forth in claim 4, wherein each of said plurality of control means comprise an AND gate.

6. An information readout control system as set forth in claim 1, wherein said information carrier means is a tape.